W. P. SIMS.
VEHICLE BRAKE.
APPLICATION FILED JUNE 4, 1908.
907,189.
Patented Dec. 22, 1908.
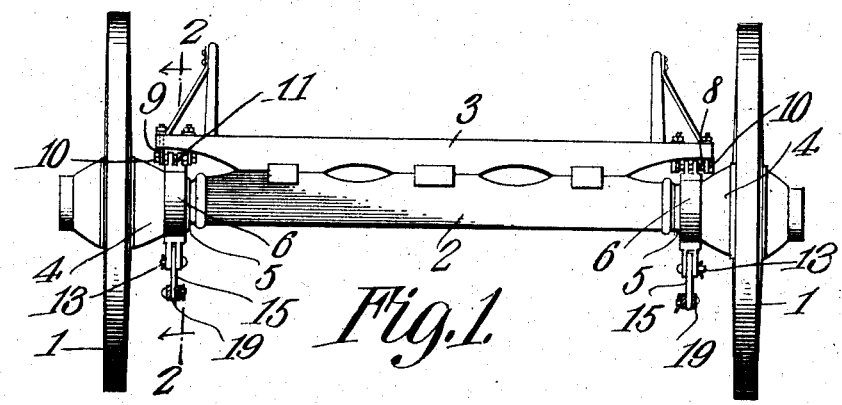
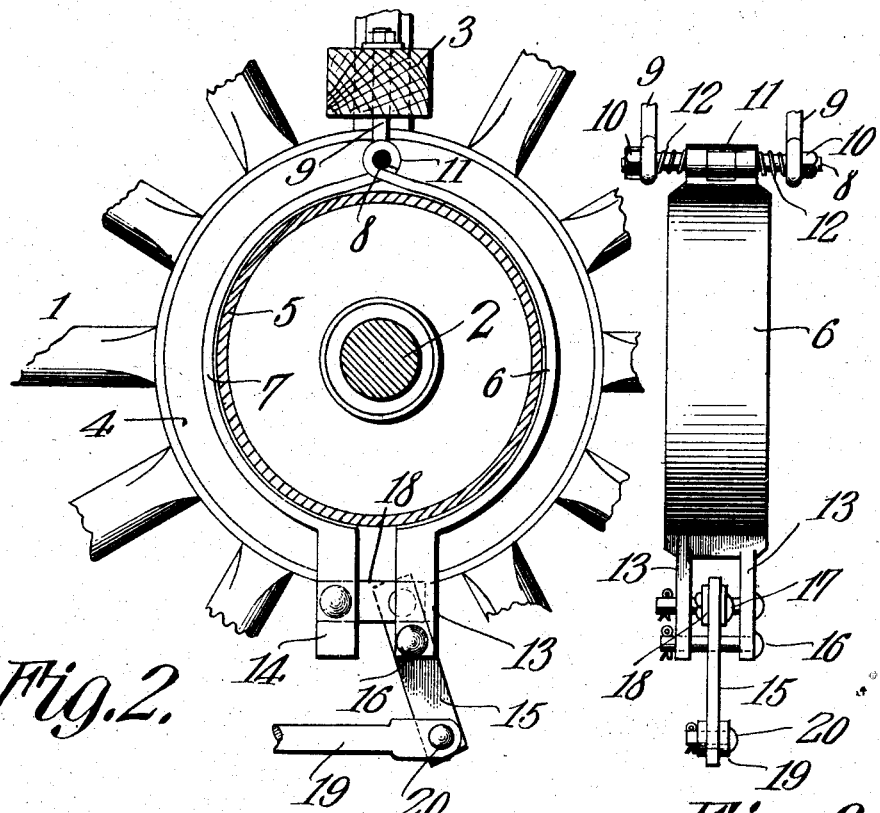
Inventor
Walter P. Sims.

UNITED STATES PATENT OFFICE.

WALTER P. SIMS, OF NEZPERCE, IDAHO.

VEHICLE-BRAKE.

No. 907,189.      Specification of Letters Patent.      Patented Dec. 22, 1908.

Application filed June 4, 1908. Serial No. 436,702.

*To all whom it may concern:*

Be it known that I, WALTER P. SIMS, a citizen of the United States, residing at Nezperce, in the county of Nez Perce and State of Idaho, have invented a new and useful Vehicle-Brake, of which the following is a specification.

This invention relates to vehicle brakes; and has for its object to provide a brake of clutch type to be applied to the hubs of vehicle wheels and be operated by a rod or rods leading to the front or other convenient part of the vehicle which rod or rods, on being moved, causes a pair of semi-circular bands to clamp a friction band fixed on each hub and thus retard the rotation of the wheels.

With this and other objects in view the invention consists of the novel construction and arrangement of parts hereinafter described and claimed, and illustrated in the accompanying drawing in which—

Figure 1 is a rear elevation of the running gear of a vehicle showing the improved brake applied to each rear wheel. Fig. 2. is an enlarged sectional view on the line 2—2 of Fig. 1, and:—Fig. 3 is a rear view enlarged of a brake removed from the vehicle.

Similar reference numerals are used for the same parts in all the figures.

In the drawing, 1 indicates the rear wheels of a vehicle mounted on an axle 2 on the top of which a bolster 3 is secured, a construction commonly found in wagons and other types of vehicles.

On the inside end of one or both hubs 4 of the rear wheels is shrunken a circular metal band 5 which the clutch members 6 and 7 of the brake are adapted to clamp when the device is operated. Each clutch member 6 and 7 is made of a semi-circular band, as wide as necessary, the two bands of each brake being hinged together above the hub 4 on a horizontal pin 8 parallel with the axle and supported by means of two eye bolts 9 depending from an end of the bolster 3 and engaging the ends of the pin 8 fastened in said eye-bolts by nuts 10. A bolt and nut may be used instead of a pin and two nuts, as is obvious. Between the hinge joint 11 of the brake members 6 and 7 and the eye bolts 9 are two coil springs 12, one on each side of the hinge joint, the use of which enables the brake members to follow the side motion of the wheels when traveling over uneven ground.

Below the hub the clutch or brake members 6 and 7 are spaced a short distance apart and each has two depending fingers parallel to each other, those on the member 6 being numbered 13 while those on the member 7 are numbered 14. Between the fingers 13 is a lever 15 fulcrumed intermediate its ends on a pin 16 passing through the fingers 13 near their lower ends. The upper end of the lever 15 is pivotally connected by a pin or bolt 17 to one end of a link 18 hinged at its other end between the depending fingers 14 on the brake member 7. A rod 19 is connected to the lower end of the lever 15 by a pin 20 and extends to any part of the vehicle most convenient for operation. Where two brakes are used, the rods 19 may be operated independently, or together by any one of the numerous and well known devices for the purpose, and as this portion of the brake mechanism forms no part of the present invention illustration thereof is not deemed necessary.

Normally, the brake or clutch members 6 and 7 are held out of contact with the friction band 5 by the rod 19, but when the brake is to be applied, this rod is operated to turn the lever 15 on its fulcrum and draws the fingers 13 and 14 closer together, swinging the brake members on their hinge pin and clamping the outer surface of the friction band.

What is claimed is:—

1. In a vehicle brake, in combination with a support and a wheel hub provided with a friction band, eye members fixed upon the support, a pair of semi-annular members provided at their connecting ends with registering eyes, a hinge pin passed through the eyes of the semi-annular members and through the first mentioned eyes, the said wheel hub being rotatable between the two semi-annular members, means whereby the two members may be brought into gripping engagement with the wheel-hub and a spring on the hinge pin between each of the first mentioned eyes and the corresponding one of the outer ones of the eyes of the semi-annular brake members.

2. A vehicle brake comprising two semi-circular members mutually hinged together at one end on a pin supported by eye bolts fastened to the vehicle bolster, a spring between said semi-circular members and each eye bolt, a lever pivoted to a finger on the free end of one of said semicircular members and connected by a link to a finger on the end of the coöperating member, a friction band on a wheel hub adapted to rotate freely between said brake members, and means for clamping said members around said friction band.

In testimony that I claim the foregoing as my own, I have hereto affixed my signature in the presence of two witnesses.

WALTER P. SIMS.

Witnesses:
   O. W. LEGGETT,
   DAY A. LINDER.